United States Patent [19]

Tinner

[11] Patent Number: 4,669,701
[45] Date of Patent: * Jun. 2, 1987

[54] SHUT-OFF APPARATUS
[75] Inventor: Friedrich Tinner, Haag, Switzerland
[73] Assignee: Cetec AG, Sax, Switzerland
[ * ] Notice: The portion of the term of this patent subsequent to May 6, 2003 has been disclaimed.
[21] Appl. No.: 859,345
[22] Filed: May 5, 1986

Related U.S. Application Data

[63] Continuation of Ser. No. 680,079, Dec. 10, 1984, Pat. No. 4,586,693.

[30] Foreign Application Priority Data

Dec. 13, 1983 [CH] Switzerland ............ 6648/83

[51] Int. Cl.⁴ ........................................... F16K 31/122
[52] U.S. Cl. ....................................... 251/56; 251/58; 251/252; 251/308
[58] Field of Search ............... 74/25, 57, 89; 251/56, 251/58, 62, 229, 252, 305, 308

[56] References Cited

U.S. PATENT DOCUMENTS 2,315,775  4/1943  D'Arcey ............... 251/58
2,910,266 10/1959  Condello et al. ....... 251/56
3,492,880  2/1970  Pearson ............... 251/58
4,120,479 10/1978  Thompson et al. ...... 251/56
4,241,897 12/1980  Maezawa .............. 251/252
4,253,640  3/1981  Priese et al. ........ 251/56
4,293,117 10/1981  Mueller .............. 251/252
4,350,322  9/1982  Mueller .............. 251/252
4,436,280  3/1984  Geisow ............... 251/56

Primary Examiner—Gerald A. Michalsky
Attorney, Agent, or Firm—Browdy and Neimark

[57] ABSTRACT

The apparatus comprises a disk shaped shut-off flap located in the passage of a main body. The shut-off flap is mounted such to a rocking shaft that the flap can be lifted off its seat during one phase of movement of the rocking shaft and may be rotated into an open position during a further phase of movement of the rocking shaft. The operating means comprises a linear drive in the shape of a control rod including a control groove. A follower and driving means engages the control groove and the shut-off flap. Accordingly the shut-off flap is guided for above lift off and rotating movements. This linear drive allows an impeccable sealing between the inner space of the shut-off apparatus and the environment.

14 Claims, 5 Drawing Figures

SHUT-OFF APPARATUS

This is a continuation of application Ser. No. 680,079 filed Dec. 10, 1984, now U.S. Pat. No. 4,586,693.

BACKGROUND OF THE INVENTION

1. Field of the Invention

The present invention relates to a shut-off apparatus, including a main body provided with a passage, a disk shaped shut-off flap, a seat located in said passage and intended to cooperate with said shut-off flap, a rocking shaft extending perpendicularly to said passage, which shut-off flap is mounted to said rocking shaft for relative movement thereto in longitudinal direction thereof but positive rotational movement therewith, and including an operating means operative to lift said flap off said seat or to place said flap on said seat, respectively, during one phase of movement, and to rotate said flap in its lifted off position and said rocking shaft in a further phase of movement, and including further drive means for driving said operating means.

2. Description of the Prior Art

Such shut-off apparatus is for instance disclosed in the Swiss patent application No. 6388/82. The shut-off apparatus disclosed in mentioned patent application as well as other shut-off apparatuses presently on the market are provided with operating means which must be controlled at a location outside of the base body, by means of which operating means the two phases of movement of the shut-off flap are carried out by means of a rotational movement.

The drawback of the construction of these known shut-off apparatuses is that the sealing of the operating means against the base body, i.e. against the environment, is insufficient, at least for certain applications of the shut-off apparatus. An absolutely safe gas or liquid-tight seal is not possible.

SUMMARY OF THE INVENTION

Hence, it is a general object of the present invention to provide an improved construction of a shut-off apparatus which has an operating and driving means for its shut-off flap which has a safe gastight and liquid-tight seal.

A further object of the invention is to provide a shut-off apparatus which comprises an operating means consisting of a linear drive located within the rocking shaft controlling the movement of the shut-off disk.

The linear drive comprises preferably a linearly reciprocable control rod extending from the outside laterally through the main body and into within the rocking shaft, which control rod is provided with a control groove arranged on its surface and intended to determine the desired movement phases, and comprises further a follwer and driving means which is coupled to said control rod for a control rod initiated movement and engaging said shut-off flap from below and received in said control groove.

A further object is to provide a shut-off apparatus having a control rod which is locked against rotation and which comprises further a spring means operative to secure a permanent engagement between the shut-off flap and the follower.

Preferably the follower and driving means comprise a rolling body, for instance, in the shape of a bearing ball which is located in a through bore of a guide member for the shut-off flap projecting laterally from the rocking shaft.

A further object is to provide a shut-off apparatus including a cylindrical control rod, wherein the control groove thereof comprises a first planar section extending in longitudinal direction of the rod and corresponding to the closed position of the flap, and comprises a further longitudinally extending section adjoining the first planar section and having a successively increasing depth, which further section is intended to control the lateral movement of the flap, and comprises a curvilinearly extending section adjoining the further section and intended to control the positive rotating movement of the rocking shaft and the flap.

The inventive construction allows now a complete and safe sealing of the control rod of the operating means against the base body and accordingly against the environment. Such sealing may be a bellows type seal, for instance, a spring bellows located between base body and control rod.

The drive means for driving the operating means comprises preferably a hydraulic or pneumatic cylinder-piston device. An electromechanical drive would be suitable, too.

BRIEF DESCRIPTION OF THE DRAWINGS

The present invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
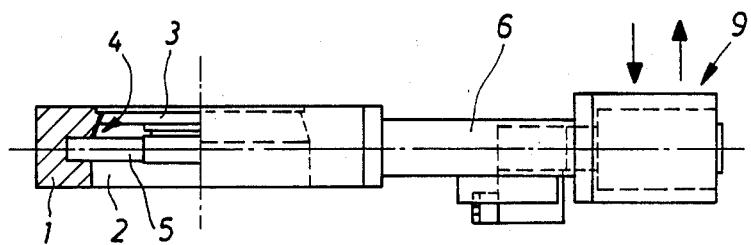
FIG. 1 is a side view, partly in section, of a shut-off apparatus constructed according to the present invention.
Figure 2:
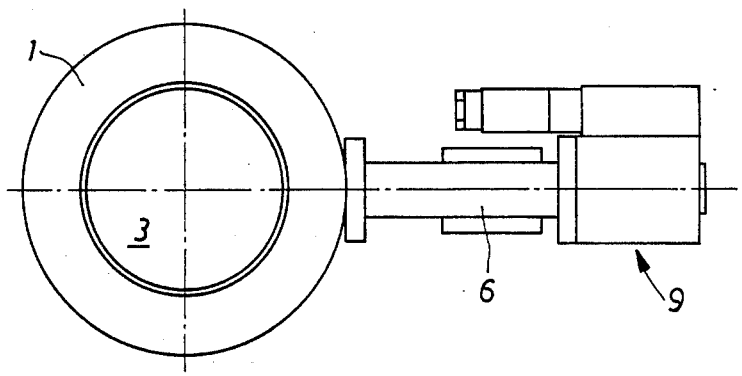
FIG. 2 is a front view of the apparatus illustrated in FIG. 1.
Figure 4:
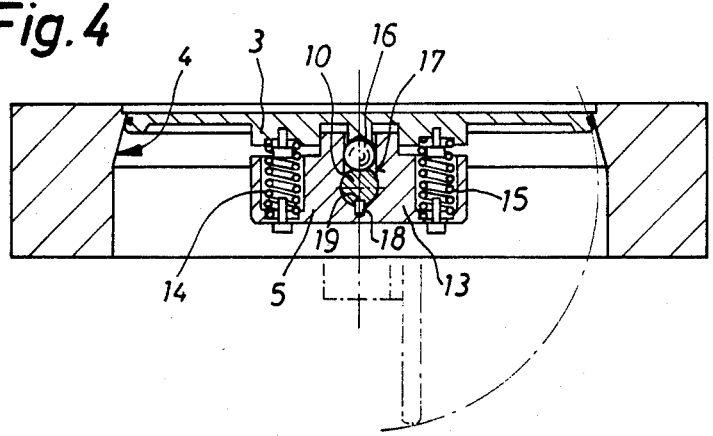
FIG. 4 is a view of a section along line IV—IV of FIG. 3.
Figure 3:
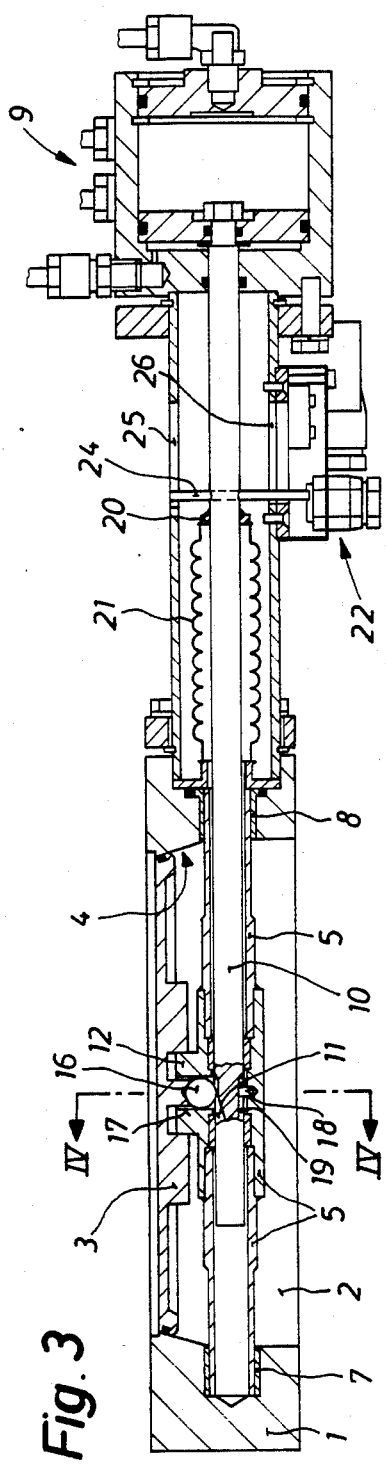
FIG. 3 is a sectional view of the apparatus of FIG. 1 illustrating the shut-off flap in its closed position and on a somewhat enlarged scale.
Figure 5:
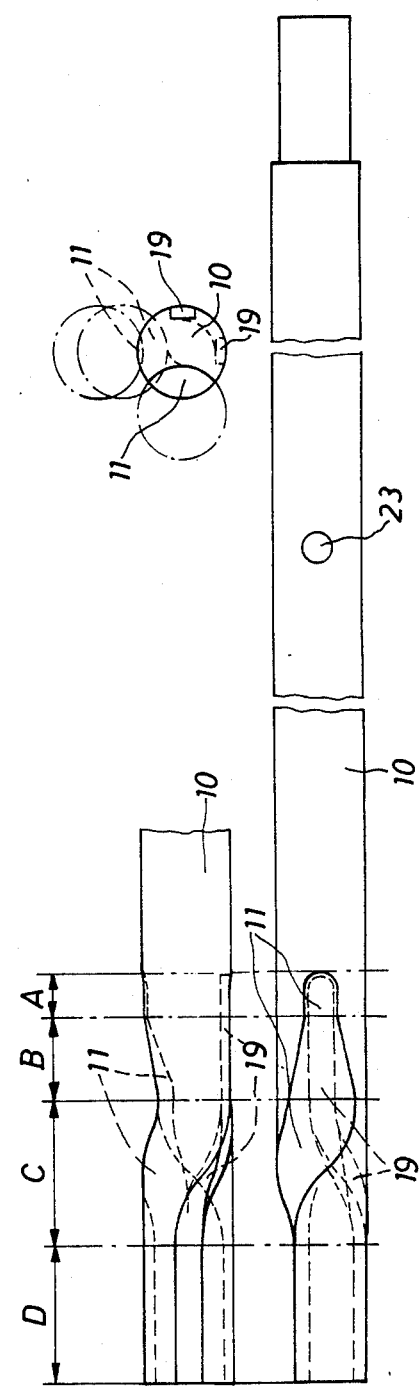
FIG. 5 is an illustration of the control grooves located in the control rod in accordance with the present invention.

Describing now the drawings it will be understood that the illustrated shut-off apparatus comprises a main body 1 which is designed to be flanged onto a pipe or tube conduit, a disk shaped shut-off flap 3 located in a passage 2 of the main body 1, which shut-off flap 3 rests on a seat 4 in the passage 2 and is located on a rocking shaft 5 and operating means and drive means 6 for latter rocking shaft 5. The shut-off flap 3 is mounted on the rocking shaft 5 for a lateral movement relative thereto, is however rotatable or rockable, respectively, with the rocking shaft. The operating means which will be described in detail further below with reference to FIGS. 3–5 are operative to lift the shut-off flap 3 off its seat 4 during a movement phase or to place the flap 3 onto its seat 4, respectively, and, furthermore, to rotate the shut-off flap 3 in its lifted off position together with the rocking shaft 5 during a further phase of movement. FIGS. 3 and 4 of the drawings illustrate details of the mounting of the shut-off flap 3 on the rocking shaft 5 as well as of the operating and driving means therefor.

In the figures the shut-off flap 3 is shown in its position abutting the seat 4 in the passage 2 of the main body 1 and the rocking shaft 5 assembled from a plurality of parts is supported in suitable bearings 7, 8 located in the main body.

The operating means comprise basically a linear drive located within the rocking shaft 5. This drive has a cylindrical shaft 10 projecting into within the rocking shaft 5, which cylindrical shaft 10 is reciprocably driven by the cylinder-piston device 9. A control groove 11 which determines the desired movement phases and movements is located at or in, respectively, the surface of the control rod consisting of the cylindrical shaft 10. This control groove 11 will be explained in detail further below with reference to FIG. 5.

The shut-off flap 3 is supported for a lateral movement on a cylindrical guide member 12 which projects in turn laterally from the rocking shaft 5. This guide member 12 forms part of a larger supporting block 13, which in turn forms part of the middle section of the rocking shaft 5. This guide member 12 contains, furthermore, tension springs 14, 15, which bias the shut-off flap 3 permanently against the follower and driving means 16, thus keeping the engagement therewith and, furthermore, maintain the follower and driving means 16 in engagement with the control groove 11.

Mentioned follower and driving means 16 are located in a through bore 17 of the cylindrical guide member 12 and in the illustrated embodiment are formed by a bearing ball. Furthermore, a pin 18 is arranged diametrically opposite of the ball 16 and rigidly mounted to the middle section of the rocking shaft 5, which pin 18 extends into a further control groove 19 of the control rod 10. The extent and shape of the further control groove 19 corresponds to such of the control groove 11, such that the ball 16 and the pin 18 form a twin follower and driving member.

FIG. 3 illustrates also how the inner space of the shut-off apparatus is sealed against the environment by means of a spring bellows type seal 21 mounted at the end to the main body 1 and at the other end to a mounting annulus 20 of the control rod 10. This arrangement allows obviously a liquid-tight and gastight sealing of the inner space of the shut-off apparatus relative to the environment upon a proper selection of the material for this spring bellows.

Limit switches generally indicated by the reference numeral 22 are provided, which limit switches can give signals indicating the respective positions of the control rod.

FIG. 5 of the drawings illustrate finally the cylindrical shaft 10 including the control grooves 11 and 19. These grooves are located at the surface of the cylindrical control rod symmetrical about its axis such that the rotating or rocking, respectively, of the shut-off flap 3 can be induced by means of the ball 16 and the pin 18.

The control rod 10 is provided, furthermore, with a through passage 23 and a guide pin 24 extends through this through passage 23, which guide pin 24 in turn projects into longitudinally extending slots 25, 26, thus guiding or locking, respectively, the control rod 10 against any rotational movement.

Such as clearly shown in FIG. 5, the control groove 11 has a first section A extending rectilinearly and extremely planar, i.e. parallel to the longitudinal axis of the control rod. This section A corresponds to or is allocated to the closed position of the shut-off flap 3 and due to the fact that the ball 16 in this position is located in the planar section 8, no specific forces must be maintained or considered, i.e. no driving or holding, respectively, forces are necessary.

This first section A is followed by a further rectilinearly extending section B which, however, has an increasing depth, i.e. an inclined bottom. Due to this incline it is now possible that during a movement of the control rod to the right in the figures, the shut-off flap is lifted off from its seat. At the end of section B this lifting off movement is terminated, i.e. if the rod is moved in the opposite direction correspondingly the closing movement of the flap is terminated at the correspondingly opposite end of section B adjoining section A. In a third section C the control groove 11 follows a helix winding around the circumference of the control rod 10 by an angular distance of totally 90°. Due to a reciprocating movement of the control rod being in the range defined by this section C of the control groove 11, the shut-off flap is rotated or rocked about 90° and accordingly moved into its open position. The control groove 11 comprises an extension in form of a final section D which, however, does not influence the movement of the shut-off flap.

While there is shown and described a present preferred embodiment of the invention, it is to be distinctly understood that the invention is not limited thereto, but may be otherwise variously embodied and practiced within the scope of the following claims.

I claim:

1. In a shut-off apparatus including a main body, a passage extending through said main body, a disk shaped shut-off flap, a seat located in said passage and intended to sealingly cooperate with said shut-off flap, a rocking shaft extending perpendicularly to said passage, which said shut-off flap is mounted to said rocking shaft such to allow a relative movement between said shaft and said shut-off flap in the longitudinal direction of said rocking shaft but for a positive rotational movement of said shut-off flap and said shaft around the center axis of said shaft; and including an operating means operative to lift said flap off said seat or place said flap onto said seat, respectively, during one phase of movement, and to rotate said flap in its lifted off position and said rocking shaft in a further phase of movement, and including further drive means for driving said operating means, an improvement comprising a linear drive located within said rocking shaft and forming said driving means, which linear drive comprises:

a linearly reciprocable nonrotatable control rod extending from the outside laterally through said main body and into within said rocking shaft and having a control groove extending at its surface for the determination of said phases of movement, a follower and driving means which is coupled to said control rod for a control rod initiated movement and engaging said shut-off flap from below and received in said control groove, and means securing a permanent engagement between said shut-off flap and said follower and driving means and thus maintaining the drive connection between said control groove and said flap.

2. The improvement of claim 1, said follower and driving means comprising a rolling body located in a through bore of a guide member for the shut-off flap projecting laterally from said rocking shaft.

3. The improvement of claim 1, including a cylindrical control rod, said control groove comprising a first section, adjoined by a second section, adjoined in turn by a third section;

which first groove section is a planar section extending in longitudinal direction of said control rod and parallel to its center axis and corresponds to the shut-off position of said shut-off flap;

which second groove section has an inclined base and extends in longitudinal direction of said control rod, which base is inclined relative to the center axis of the control rod and has a depth which increases at an increasing distance from the first groove section, and which second groove section is intended to control the lateral movement of said shut-off flap relative to its seat in said passage;

which third section extends helically around said control rod and is intended to control the positive rotating movement of said rocking shaft and said flap.

4. The improvement of claim 3, comprising a spring bellows mounted at one end to said control rod and at the other end to said main body such to seal said control rod of said linear drive against the environment.

5. The improvement of claim 3, including limit switches coupled to said control rod and intended to indicate the respective end positions of said shut-off flap.

6. The improvement of claim 1, in which said drive means for driving said operating means comprises a pneumatic cylinder-piston device.

7. The improvement of claim 1, in which said drive means for driving said operating means comprises a hydraulic cylinder-piston device.

8. An improved shut-off apparatus including a main body, a passage extending through said main body, a disk shaped shut-off flap, a seat located in said passage and intended to sealingly cooperate with said shut-off flap, a rocking shaft extending perpendicularly to said passage, which shut-off flap is mounted to said rocking shaft such to allow a relative movement between said shaft and said shut-off flap in the longitudinal direction of said rocking shaft but for a positive rotational movement of said shut-off flap and said shaft around the center axis of said shaft, and including a linearly reciprocable nonrotatable control rod extending from the outside laterally through said main body and into within said rocking shaft and operative to induce a lifting of said flap off said seat or a placing of said flap onto said seat during one phase of movement and to rotate said flap in its lifted off position and said rocking shaft in a further phase of movement, which control rod is provided with a control groove located at its surface and in which a follower and driving means is received which engages said shut-off valve from below such to determine said phases of movement; and including a drive means for reciprocately driving said control rod;

the improvement comprising means securing a permanent engagement between said shut-off flap and said follower and drive means and thus maintaining the drive connection between said control groove and said flap, and said follower and drive means comprising a rolling body located in a through bore of a guide member for the shut-off flap projecting laterally from said rocking shaft.

9. The improvement of claim 8 having a cylindrical control rod, said control groove comprising a first section, followed by a second section, followed in turn by a third section; which first groove section is a planar section extending in longitudinal direction of said control rod and parallel to its center axis and is allocated to the shut-off position of said shut-off flap;

which second groove section has an inclined base and extends in longitudinal direction of said control rod, which base is inclined relative to the cneter axis of the control rod and has a depth which increases at an increasing distance from the first groove section, and which second groove section is allocated to the lateral movement of said shut-off flap relative to its seat in said passage;

which third groove section extends helically around said control rod and is allocated to the positive rotating movement of said rocking shaft and said flap.

10. The improvement of claim 8, in which said control rod is sealed by means of a bellows against said base body and thus the environment.

11. The improvement of claim 10, in which said bellows is a spring bellows.

12. The improvement of claim 8, in which said drive means comprises a pneumatic cylinder-piston device.

13. The improvement of claim 8, in which said drive means comprises a hydraulic cylinder-piston device.

14. The improvement of claim 8, including limit switches coupled to said control rod and intended to indicate the respective end positions of said shut-off flap.

* * * * *